United States Patent Office 3,154,124
Patented Oct. 27, 1964

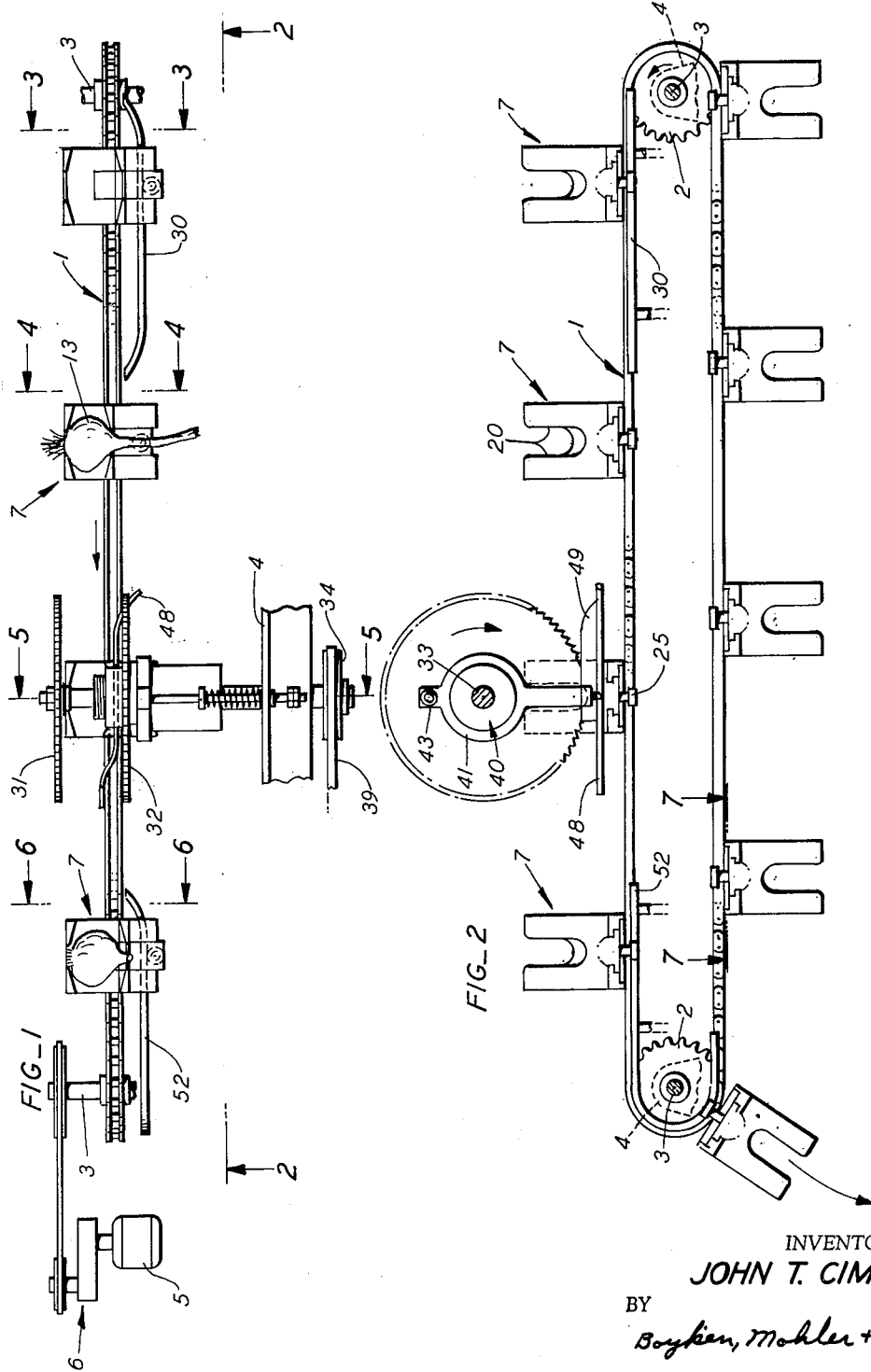

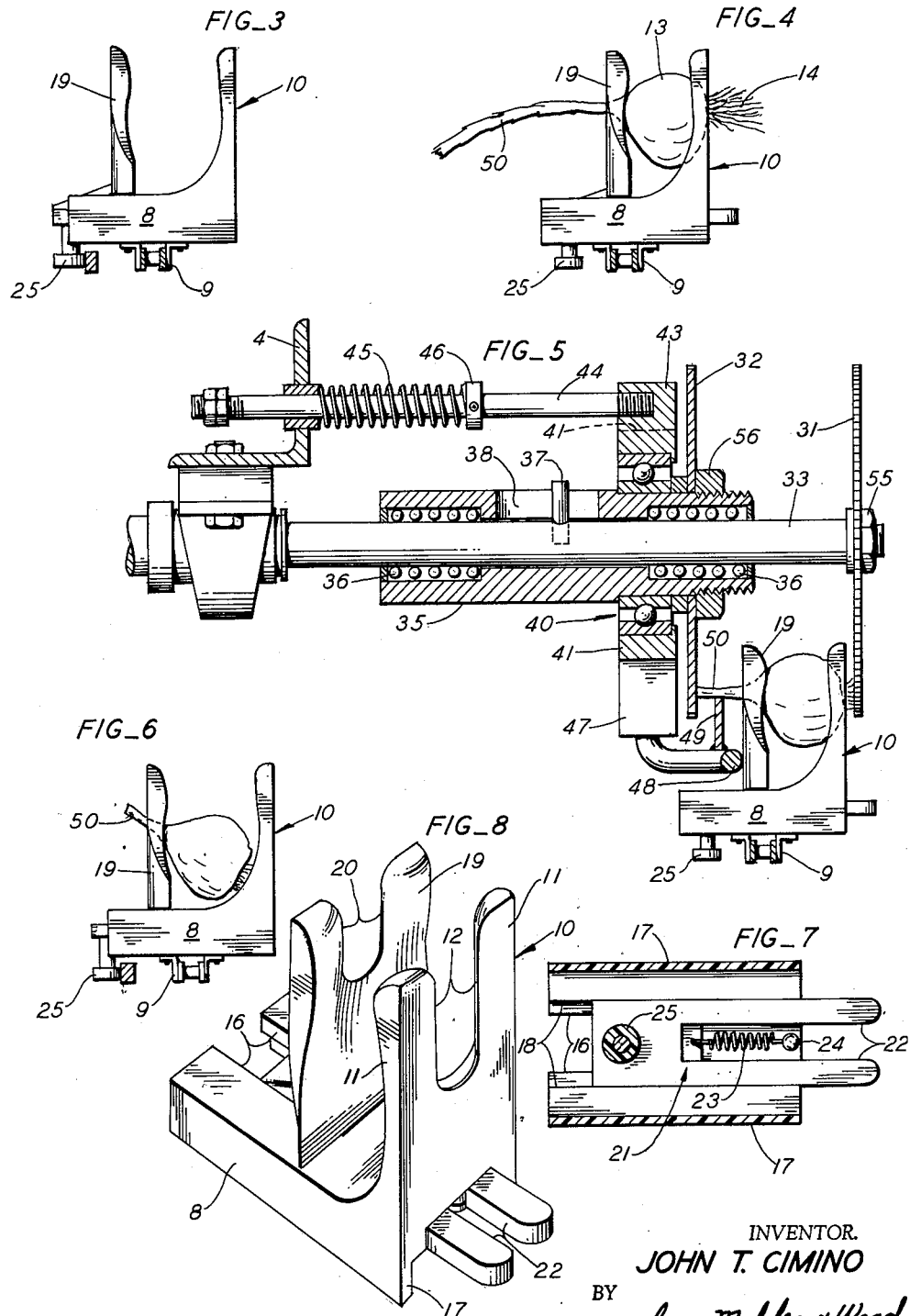

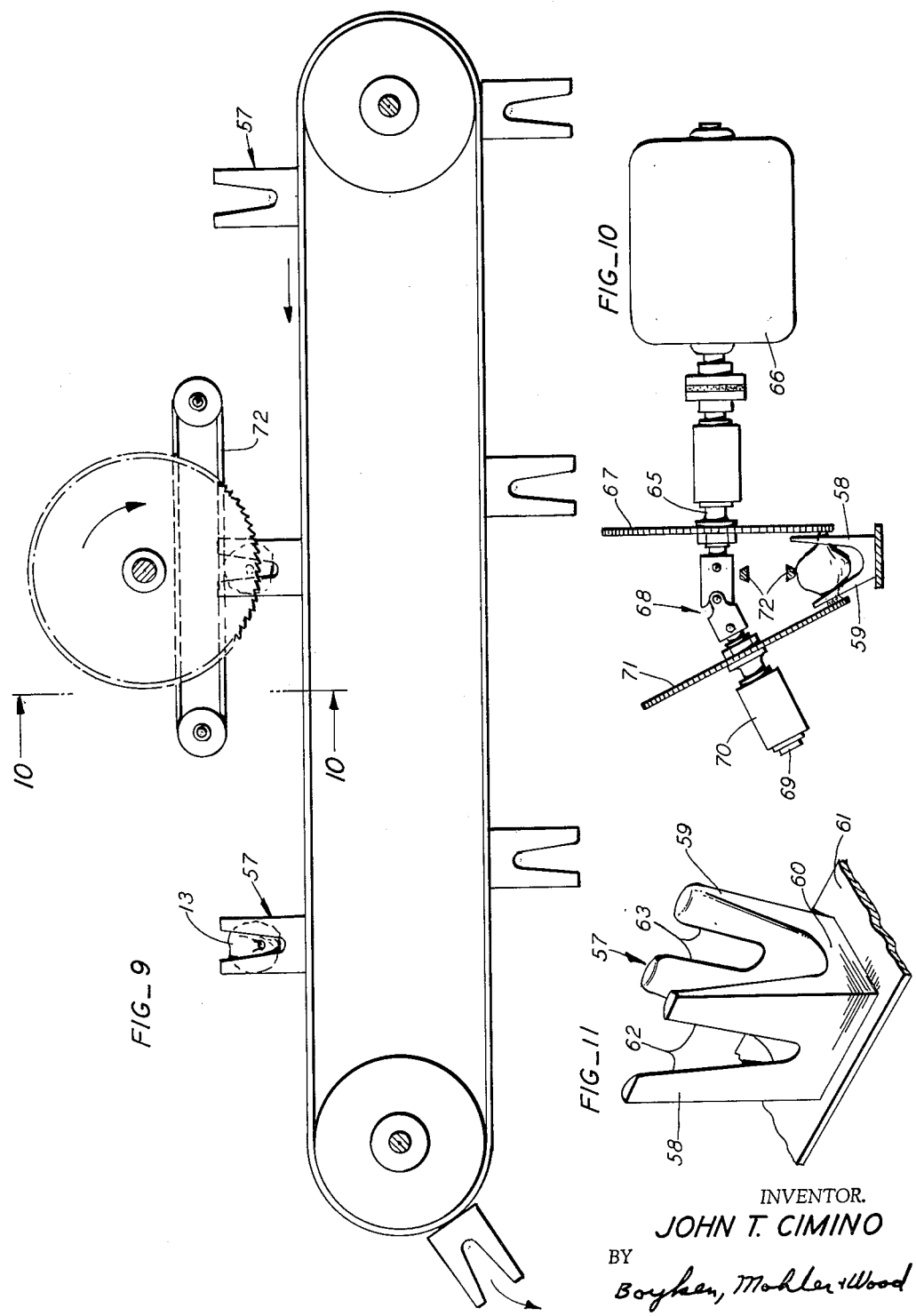

3,154,124
GARLIC TRIMMER
John T. Cimino, Gilroy, Calif., assignor to
The Cimino Corporation, Gilroy, Calif.
Filed Jan. 12, 1962, Ser. No. 165,866
5 Claims. (Cl. 146—81)

This invention relates to a garlic trimmer and has for one of its objects the provision of an improved machine for more cleanly, efficiently, and uniformly trimming the root and stem ends from the garlic bulbs than heretofore.

Garlic, as harvested, has a relatively long stem at the stem side of the bulb, and a plurality of relatively string-like roots projecting from the root side. The stems and roots must be cut off to prepare the garlic for the market, but the stems must not be cut too short. The roots, on the other hand, should be trimmed off fairly close to the bulb.

An object of the invention is the provision of a simple, reliable machine that is adapted to automatically cut the stems from the garlic at the correct distance from the bulb, irrespective of variations in the sizes of the bulbs, and which machine is also adapted to trim the roots from the bulb close to the latter.

A still further object of the invention is the provision of a rotary cutter in a machine for trimming garlic, and which cutter is associated with means responsive to changes in the size of the garlic for automatically moving the cutter toward and away from the garlic bulb, as the latter is moved past the cutter, according to the size of the garlic bulb.

An added object of the invention is the provision of an improved machine for simultaneously and uniformly trimming the stems and roots from garlic, with the said roots being trimmed off at a uniform distance from the garlic bulb, while the stem is trimmed off at the same distance from the bulb irrespective of difference in the diameter of the bulbs along their stem-root axes.

Other objects and advantages will appear in the description and in the drawings.

In the drawings, FIG. 1 is a top plan view of a garlic trimming machine illustrative of the invention.

FIG. 2 is a view taken along line 2—2 of FIG. 1.

FIG. 3 is an enlarged view of one of the garlic holders as seen along line 3—3 of FIG. 1, the view being taken at the loading station.

FIG. 4 is an enlarged view of one of the garlic holders as seen along line 4—4 of FIG. 1 with a garlic held thereon.

FIG. 5 is an enlarged cross-sectional view taken along line 5—5 of FIG. 1.

FIG. 6 is a view taken adjacent to the discharge station, along line 6—6 of FIG. 1.

FIG. 7 is an enlarged cross-sectional view taken along line 7—7 of FIG. 2.

FIG. 8 is an enlarged, isometric, three-quarter view of a garlic holder of the machine of FIG. 1.

FIG. 9 is a cross-sectional view, similar to that of FIG. 2, but showing a modification of the invention that is shown in FIGS. 1–8.

FIG. 10 is a cross-sectional view taken along line 10—10 of FIG. 9; and

FIG. 11 is an enlarged isometric view of one of the holders of FIG. 9.

In detail, the machine of FIGS. 1, 2 comprises a horizontally extending endless chain 1 supported at its ends on sprocket wheels 2 that are secured on horizontally disposed shafts 3. These shafts are journalled for rotation in bearings carried by any suitable rigid frame 4 (FIG. 2). One of said shafts, preferably the shaft at the left-hand or discharge end of the chain, as seen in FIG. 1 may be connected with motor 5 through any suitable variable speed driving connection 6 as semi-schematically indicated in FIG. 1, for moving the upper run of the chain 1 from right to left as seen in FIG. 1.

Carried on said chain are a plurality of spaced garlic holders generally designated 7.

Each holder 7 comprises an L-shaped member, the lower, horizontally extending base 8 of which is secured to one of the links 9 of chain 1. The base 8 is positioned crosswise relative to the length of chain 1, and is positioned so that the portion 10 of the L that extends upwardly from one end of base 8, is offset to one side of chain 1. All of the L-shaped holders are similarly positioned on chain 1, and it is also to be noted that the outwardly facing lateral surface of portion 10 that faces generally away from base 8, is flat, and vertical (FIG. 8).

The portion 10 of each holder is generally U-shaped thereby providing a pair of horizontally spaced, upwardly extending legs 11 (FIG. 8), the adjacent edges or sides of which legs define the opposite sides of a vertically upwardly opening slot 12. The closed lower end of slot 12 is preferably spaced above the juncture between the base member 8 and portion 10, and the side of the holder at said juncture that is at the re-entrant side of the L is concavely curved in both vertical and horizontal planes to generally conform to the convex outer surface contour of a garlic bulb 13 (FIGS. 1, 4). Also the laterally facing surfaces of the legs above said juncture are also curved concavely, both vertically and horizontally. In FIG. 1 the contour in a horizontal plane is shown and in FIG. 8 the concave contour in the vertical plane is indicated. These curvatures generally conform to the convex contour of the outer surface of garlic, although it is obvious that they will not exactly conform to the curvatures of all different sizes of garlic bulbs.

When a garlic bulb is positioned in a holder, the root end will be against the convexly curved surfaces of the legs 11 and the roots 14 will project through the slot 12.

For clarity, the curved surfaces of portion 10 will be called the inner surfaces since they are at the re-entrant side of the angle produced by the base 8 and upstanding portion 10.

It is important to note that the curved inner surfaces of legs 11 and the curved inner surface of the portion of the L-shaped part that is at the juncture between the base and portion 10, terminate in relatively thin edges along slot 12. By this structure, when a garlic bulb has its root end against said inner surfaces with the roots on the U-shaped lower end of the slot, the roots may be cut off very close to the garlic bulb by a cutter that is close to the flat outer surface of the up-standing portion 10. Such cutter will later be described.

The base portion 8 of the L-shaped part of the holder 7 is formed with a slot 16 (FIG. 7) extending longitudinally of said base 8 and opening outwardly of the end of the latter that is remote from portion 10.

The width of the base 8 is preferably of substantially the same width as the portion 10, and flanges 17 extending longitudinally of base 8 depend from the said base 8 along the outer lateral surfaces of said base.

The slot 16 terminates in a closed end of approximately the point where the curved inner surface of the juncture between the base 8 and portion 10 merges into base 8.

The underside of base 8 is formed with a downwardly opening recess 18 that extends longitudinally of said base from end to end thereof and which recess opens laterally oppositely outwardly at the base at its ends. The width of the recess is greater than the width of slot 16, hence extends along the adjacent sides of the base along the slot in the form of rabbets.

The garlic engaging surface of portion 10 has been described. Opposed to the concavely curved side of portion 10 is a vertical wall 19 that is of substantially the same width as the width of portion 10. This wall 19 is formed with a vertically upwardly opening slot 20 that substantially registers horizontally with slot 12, and the surfaces of said wall that face the portion 10 may also be slightly concavely curved.

This wall 19 forms the side of the holder 7 that is opposite to the portion 10, and slot 20 preferably terminates at a level slightly above the level of the closed end of slot 12, to support garlic bulb with its root-stem axis more nearly horizontal than would otherwise be the case.

It should be noted that the bulbs are preferably and normally supported from their stems and roots (FIG. 4) rather than having their bodies seated against the base 8. This forms a more accurate and a more stable support for the garlic during trimming.

The wall 19 is formed with a horizontally elongated slide portion 21 at its lower end (FIG. 7) that slidably fits in recess 18 and in the rabbet-like extensions of said recess that are along the adjacent sides of the slot 16. This slide 21 is formed with a slot 22 extending longitudinally thereof and opening outwardly of the end thereof that is nearest the portion 10 of the holder. A coil spring 23 positioned within slot 22 is connected at one end thereof with a downward projection 24 that in turn is below portion 10 and between the sides of recess 18, while the opposite end of said spring is connected with the slide 21 at the closed end of slot 22.

Since wall 19 is positioned intermediate the ends of the slide or portion 21 that is in recess 18, the slide provides a stable bearing for the wall.

By this structure the wall 19 is at all times yieldably drawn toward the portion 10 of the holder.

Also carried by slide 21 and projecting downwardly from the underside thereof is a vertical roller 25.

When there is no garlic 13 between the garlic engaging wall 19 and the portion 10, which may be called the lateral side of the holder, the said sides of the holder will be spaced apart to a degree, and roller 25 will be spaced from chain 1.

As seen in FIGS. 1, 2, a cam track 30, suitably supported on the rigid frame of the machine, extends longitudinally of the chain 1 alongside the right end of the latter. This cam track curves toward the chain 1 at both of its ends, and when the chain is actuated to move the holders from the feed end, which is at the right-hand end of the machine as seen in FIG. 1 toward the discharge end, which is the left-hand end, the roller 25 of each holder will engage the cam track 30 and will be moved in a direction away from the chain 1 to move the side or wall 19 of holder 7 away from the side or wall 10 thereof, so that an operator may position a garlic bulb between said sides, with the roots 14 projecting through slot 12 and with the stem projecting through slot 20.

Upon the holders being carried past the cam track 30, the springs 23 will cause the sides 19 of the holders to yieldably move into engagement with the sides of the bulbs from which the stems project, thus forcing the root ends of the garlic bulbs against the sides 10 of the holders.

When the bulbs are held in this position, they are carried between and past a pair of coaxial vertically disposed circular saws 31, 32.

As seen in FIG. 5, the saw 31 is the root cutting saw, and this saw is supported on a shaft 33 that is journalled for rotation in bearings that are carried by frame 4. The position of saw 31 is fixed so that its lower cutting edge extends across laterally outwardly projected outline of the sides of each slot 12, and close to the flat outer side of the portion 10, or side 10 of holder 7 so as to cut off the projecting roots 14 close to each garlic bulb as each bulb is moved past the saw.

A pulley 34 on shaft 33 (FIG. 1) is connected by a belt 39 with a motor or with any suitable source of power for rotating the saw.

The saw 32 is also carried on shaft 33, said saw being secured on one end of an elongated sleeve 35 that is supported on shaft 33 by ball bearings 36 so that said sleeve may easily be moved longitudinally of shaft 33. A pin 37 secured on shaft 33 extends radially outwardly of the latter into a slot 38 formed in the sleeve 35 so as to connect saw 32 with shaft 33 for rotation with the latter, as by a spline connection, while permitting the saw to be moved longitudinally of said shaft toward and away from the saw 31 within the limits permitted by the ends of slot 38.

A bearing 40 around sleeve 35 supports a control means for controlling the movement of saw 32 axially thereof. This control means comprises an annular member 41 carried by bearing 40 and which member has an upward projection 43 to which is secured one end of a rod 44. Rod 44 slidably extends through a bearing carried by frame 4, and a spring 45 reacts between said frame and a collar 46 secured on said rod for yieldably urging the saw 32 toward saw 31.

The annular member 41 has a downward projection 47, the lower end of which carries a horizontally elongated cam member 48 in the form of a bar that is curved at the end thereof directed toward the oncoming holders to slidably engage the side of each wall or side 19 of each holder that faces away from chain 1, and each bar, in turn also has an upstanding cam 49 having an upper horizontal edge that is at approximately the level of the lower sides of the stems 50 of the garlic when said stems are horizontal. The end of the horizontal upper edge of cam 49 that is directed toward the oncoming holders, when chain 1 is actuated, curves downwardly.

The end of the cam 48 that is directed toward the oncoming holders curves slightly in direction away from chain 1. The other end of the cam 48 curves generally toward the chain and is adapted to extend over it as seen in FIG. 1.

Saw 32 is positioned between the cam 49 and the projection 47, and it is apparent that the cam bar 48, cam 49, and saw 32 will all move together axially of shaft 33 that carries them.

In operation, upon a holder reaching the cam 48, the saw 32 will be moved axially of the shaft 33 a uniform distance away from the side 19 of the holder, irrespective of the root-stem diameter of the garlic bulb that may be in the holder, and cam 49 will elevate drooped stems so the latter will always be cut off at the same distance from the bulb, and all stub-stems will be of the same length.

As soon as a stem is cut off by saw 32, the cam bar 48 will cause the saw to be moved away from the holder a substantial distance.

The removal of the roots and the cutting of the stems is simultaneous.

At the discharge or left-hand end of the machine, as seen in FIG. 1 is a horizontally elongated cam 52 also rigid on the frame of the machine, and which cam is similar to cam 30. The end of cam 52 that is directed toward the oncoming garlic holder is curved toward the chain 1 so that roller 25 of each holder will engage the cam, and as the holder moves to the left the roller will be moved in a direction away from the chain to move side 19 away from side 10 and to thereby release the garlic bulb, as seen in FIG. 6.

As the holder moves downwardly over sprocket wheel 2, the garlic bulb will be discharged.

In the event the saw 31 should become dull and should require replacement, it is adapted to be quickly replaced by removal of the retaining nut 55 and saw 32 can be quickly replaced at the same time by removal of nut 56.

FIGS. 9–11 show a modified form of the invention.

In this form of the invention, each holder 57 is generally U-shaped providing one side wall 58 which is vertical much the same as wall 10 in FIG. 8, while the other wall 59 is slanted away from side 58 in an upward direction. A base 60 rigidly connecting the lower ends of said sides 58, 59 is secured to an endless belt 61 with the sides 58, 59 of the holders projecting away from said belt.

Side 58 is formed with a central slot 62 that opens outwardly of the outer end of the side 58, while side 59 is formed with a similar slot 63.

The garlic bulb is positioned between the sides 58, 59 with the roots projecting through slot 63 and with the stem projecting through slot 62.

In this form of the invention, the garlic bulb will seat at its stem and root sides against the sides 58, 59 and will be closer or farther from base 60 according to the size of the bulb. In any event, the roots will project from slot 63 the same distance as in the holder of FIG. 4.

A motor shaft 65, connected with and driven by motor 66, supports a circular saw 67 thereon, said motor being supported in any suitable manner on the frame of the machine in a position so that shaft 65 is spaced above the belt 61 and holders 57 thereon, with the lower portion of the saw extending across the flat vertical outer surface of the side 58 of the holders.

A universal coupling 68 positioned over the path of travel of holders 57 connects shaft 65 with a shaft 69 that is at right angles to the plane in which the side 59 of each holder 57 is disposed, and this shaft 69 is supported for rotation in a bearing 70 that is also carried on the rigid frame of the machine in any suitable manner.

A circular saw 71 (FIG. 10) is carried by shaft 69 in a position so its lower portion is parallel with the outer flat surface of the inclined side wall 59 of holder 57.

In this form of the invention, a horizontally extending hold-down belt 72, also supported on the frame of the machine, is positioned over the belt 61 so that its lower run will extend between the sides 58, 59 of the holders as the belt is moved to the left, as seen in FIG. 9 to hold each garlic bulb in the holder during cutting. This hold-down belt need not be driven, since it will move with the garlic bulbs.

The thickness of the side 58 of the holder may determine the distance the stem is cut from the bulb, as well as the distance the saw 67 is positioned from the side 58. In any event, the stem will always be cut from the bulb at the same distance from the latter, and the roots will also be cut from the bulb close to the latter, and at the same distance from the bulb.

Since the frame that mounts the various parts of the garlic trimmer may be made in any conventional manner, it is not shown in FIGS. 9–11 and certain parts only are indicated in FIGS. 1–8.

The operation of the machines illustrated is believed to be clear. In both, substantially the same results are accomplished, that is, the uniform trimming of garlic bulbs irrespective of variations in their root-stem diameters. The structure is efficient, simple, rugged, and economical to make.

It is to be understood that the invention is not to be limited by the detailed description, but modifications may be made within the spirit of the invention and scope of the claims.

I claim:

1. A garlic trimmer for trimming the roots and stems from garlic bulbs comprising;
    (a) A row of spaced garlic holders respectively adapted to support therein garlic bulbs of different length root-stem diameters for movement of said bulbs therewith in one direction along a path of travel extending longitudinally of said row;
    (b) means supporting said holders for said movement;
    (c) means connected with said holders for moving them along said path;
    (d) each of said holders having a pair of opposed garlic bulb engaging members between which each garlic bulb is adapted to be held during said movement of said holders and each pair of said members being in alignment with each other along a line at right angles to said path;
    (e) one member of each pair thereof being adapted to engage the stem end of a garlic bulb positioned between said pair and
    (f) the other member of each pair thereof being adapted to engage the root end of a garlic bulb positioned between said pair;
    (g) said pair of members being formed with aligned openings through which the stem and roots of a garlic bulb that is held between said pair are adapted to project to opposite sides of said holder;
    (h) means supporting said one member of each pair for movement of different distances toward and away from said other member for holding garlic bulbs of different stem-root diameters between the members of each such pair;
    (i) a cutter for trimming the stems from garlic bulbs carried by said holders;
    (j) means supporting said cutter at the side of said row adjacent to said one of the members of each pair in a position for trimming the stems from said garlic bulbs as the latter are carried along said path and past said cutter, and for movement of said cutter transversely of said path to a predetermined distance from said one member upon each holder being moved past said cutter whereby the stem of each garlic bulb will be trimmed off at a uniform distance from each bulb; and
    (k) means operatively connecting said cutter with said one member for said movement of said cutter to said predetermined distance as each member passes said cutter.

2. A garlic trimmer for trimming the stems from garlic bulbs comprising:
    (a) a garlic holder adapted to support single garlic bulbs of different stem-root diameters therein for movement therewith along a predetermined path of travel in one direction;
    (b) said holder having a stationary side wall and a movable side wall opposed thereto between which each such garlic bulb is adapted to be positioned;
    (c) means supporting said movable side wall for movement different distances toward and away from said stationary side wall to engage and hold different diameter garlic bulbs against said stationary side wall;
    (d) an opening provided in said movable wall through and from which the stem of a garlic bulb held between said movable wall and said stationary wall is adapted to project.
    (e) supporting means supporting said holder for said movement along said path with said side walls in alignment with each other at right angles to said path whereby a stem projecting from said movable side wall will be moved transversely of its length as the bulb in said holder is moved along said path;
    (f) cutter means supported at a point along said path in a position extending across the length of a stem so projecting from said movable wall for severing such stem from the garlic bulb in said holder;
    (g) means supporting said cutter means at said point for movement toward and away from the path of travel of said holder, and
    (h) means connected with said cutter means actuated for movement by said movable wall upon said holder passing said cutter means for moving said cutter means a predetermined distance from said movable wall irrespective of the distance of said movable wall from said stationary wall, whereby the stems of garlic bulbs in said holder will be cut off at a uniform distance from bulbs of different sizes that are carried by said holder past said cutter means.

3. In a construction as defined in claim 2:
(i) said cutter means being a first circular saw, and
(j) the means supporting said cutter means for its said movement toward and away from said path of travel including a shaft extending across said path;
(k) a second circular saw on said shaft positioned at the side of said path opposite to the side at which said first circular saw is positioned and close to said stationary wall of said holder as said holder is moved between said first saw and said second saw;
(l) said stationary wall being formed with an opening through and from which the roots of a garlic bulb positioned between said walls are adapted to project for being trimmed off by said second saw as said holder is moved past said second saw.

4. In a garlic trimmer for trimming the root and stem ends from garlic bulbs:
(a) a holder for said bulb comprising;
(b) a substantially L-shaped member providing a horizontally disposed base and a vertical portion integrally joined therewith;
(c) the upper surface of said base and the lateral surface of said vertical portion adjoining said upper surface being concavely curved vertically and horizontally to generally conform to the convex contour of the outer surface of the root end and lateral sides of a garlic bulb;
(d) said vertical portion being formed with a vertically extending upwardly opening slot for receiving the roots of a horizontally positioned garlic bulb upon downward movement of said bulb with its root end in engagement with said concave surface of said vertical portion;
(e) a vertically disposed side wall in spaced opposed relation to said concave surface of said vertical portion;
(f) means supporting said side wall on said base for movement thereof toward and away from said vertical portion;
(g) means connected with said side wall for yieldably urging it toward said vertical portion whereby a garlic bulb positioned between said side wall and said vertical portion will be yieldably held against said vertical portion and said side wall;
(h) said side wall being formed with an upwardly opening recess through which the stem of a garlic bulb that is between said side wall and said vertical portion is adapted to project when the roots of such bulb project through the slot in said vertical portion;
(i) said slot and said recess terminating at their lower ends at distances greater than the maximum transverse diameter of a garlic bulb to be held between said wall and said vertical portion whereby the stem and roots of such bulb will always be supported at the same position irrespective of the transverse diameter of the bulbs.

5. In a holder as defined in claim 4;
(j) means below and connected with said base for moving said L-shaped member and said side wall along a path of travel extending transversely of the stem-root axis of a garlic bulb that is supported with its stem and roots respectively extending through said recess and said slot.

References Cited in the file of this patent
UNITED STATES PATENTS

| | | |
|---|---|---|
| 2,229,896 | Matthiessen | Jan. 28, 1941 |
| 2,286,648 | Rogers | June 16, 1942 |
| 2,712,334 | Bridge | July 5, 1955 |
| 2,818,899 | De Back | Jan. 7, 1958 |
| 2,877,816 | Kibler et al. | Mar. 17, 1959 |
| 2,936,013 | Kirshner | May 10, 1960 |
| 2,961,023 | Boyer | Nov. 22, 1960 |